(12) United States Patent  (10) Patent No.: US 6,568,700 B1
Losee  (45) Date of Patent: May 27, 2003

(54) LINE BACKER

(75) Inventor: Jerry Losee, Lava Hot Sprs., ID (US)

(73) Assignee: Jerry L. Losee, Lava Hot Springs, ID (US)

( * ) Notice: Subject to any disclaimer, the term of this patent is extended or adjusted under 35 U.S.C. 154(b) by 0 days.

(21) Appl. No.: 09/136,979

(22) Filed: Aug. 20, 1998

Related U.S. Application Data

(60) Provisional application No. 60/056,813, filed on Aug. 22, 1997.

(51) Int. Cl.[7] .............................................. B62D 13/00
(52) U.S. Cl. ....................................... 280/477; 340/431
(58) Field of Search ............................. 280/477, 478.1; 340/431, 435, 436, 531, 686, 687

(56) References Cited

U.S. PATENT DOCUMENTS 3,938,122 A    2/1976  Mangus ...................... 340/275
4,187,494 A  * 2/1980  Jessee ......................... 340/52
5,513,870 A    5/1996  Hickman .................... 280/477

* cited by examiner

*Primary Examiner*—Christopher P. Schwartz
*Assistant Examiner*—C. T. Bartz

(57) ABSTRACT

The line backer is a device that assists the driver in backing up to a trailer by himself. It eliminates the frustrations of climbing in and out of the vehicle and walking back to check the alignment. It also can eliminate damage to the vehicle and the trailer that is so often seen. It works by a retractable cable that hooks from the vehicle and attaches to the trailer. While backing up to the trailer there are two led lights that are facing the driver, that signals which direction to turn and when to stop. The retractable cable is electrically grounded and passes between a left and a right contact which are charged by the battery and wired to the led's. Since the retractable cable will touch a left or right contact and, thereby, power a respective left or right led light, the driver can adjust his approach angle to the trailer by keeping the lights off with the retractable cable staying in between the contacts.

1 Claim, 2 Drawing Sheets

LINE BACKER

This application is a non-provisional claiming priority on provisional application Ser. No. 60/056,813 filed Aug. 22, 1997.

CROSS-REFERENCE TO RELATED APPLICATIONS

Not Applicable

STATEMENT REGARDING FEDERALLY SPONSORED OR DEVELOPMENT

Not Applicable

REFERENCE TO A MICROFICHE APPENDIX

Not Applicable

BACKGROUND OF THE INVENTION

This invention relates to backing up to trailers by a motor vehicle. There is a lot of frustration and damage caused by people backing into their trailers while trying to back up by themselves.

BRIEF SUMMARY OF THE INVENTION

This invention is directed to backing up devices, which precisely directs the driver in backing up to a trailer that is to be hooked up. It eliminates a lot of the frustrations of trying to line up with the trailer by yourself, along with getting in and out of your vehicle to check the alignment. It also makes getting the device out and putting it away quick and easily with out taking up much space, and can be stored easily in the glove box or any place in the vehicle.

REFERENCE NUMERALS IN DRAWINGS

| | |
|---|---|
| 1. plastic box halves | 2. on/off switch |
| 3. switch mount holes | 4. battery compartment |
| 5. left & right metal contacts | 6. wire cord |
| 7. retractable reel | 8. steel cable |
| 9. captive screw & acorn nut | 10. rubber bushing |
| 11. screws | 12. wire mount hole |
| 13. battery compartment lid | 14. battery clips |
| 15. alignment eyelet screw | 16. screw posts |
| 17. label area | 18. electrical wires |
| 19. light housing halves | 20. led lights |
| 21. resister | 22. flexible magnets |
| 23. led holders | 24. crimped cable connector |

DETAILED DESCRIPTION OF FIGS. 1 & 2

Figure 1:
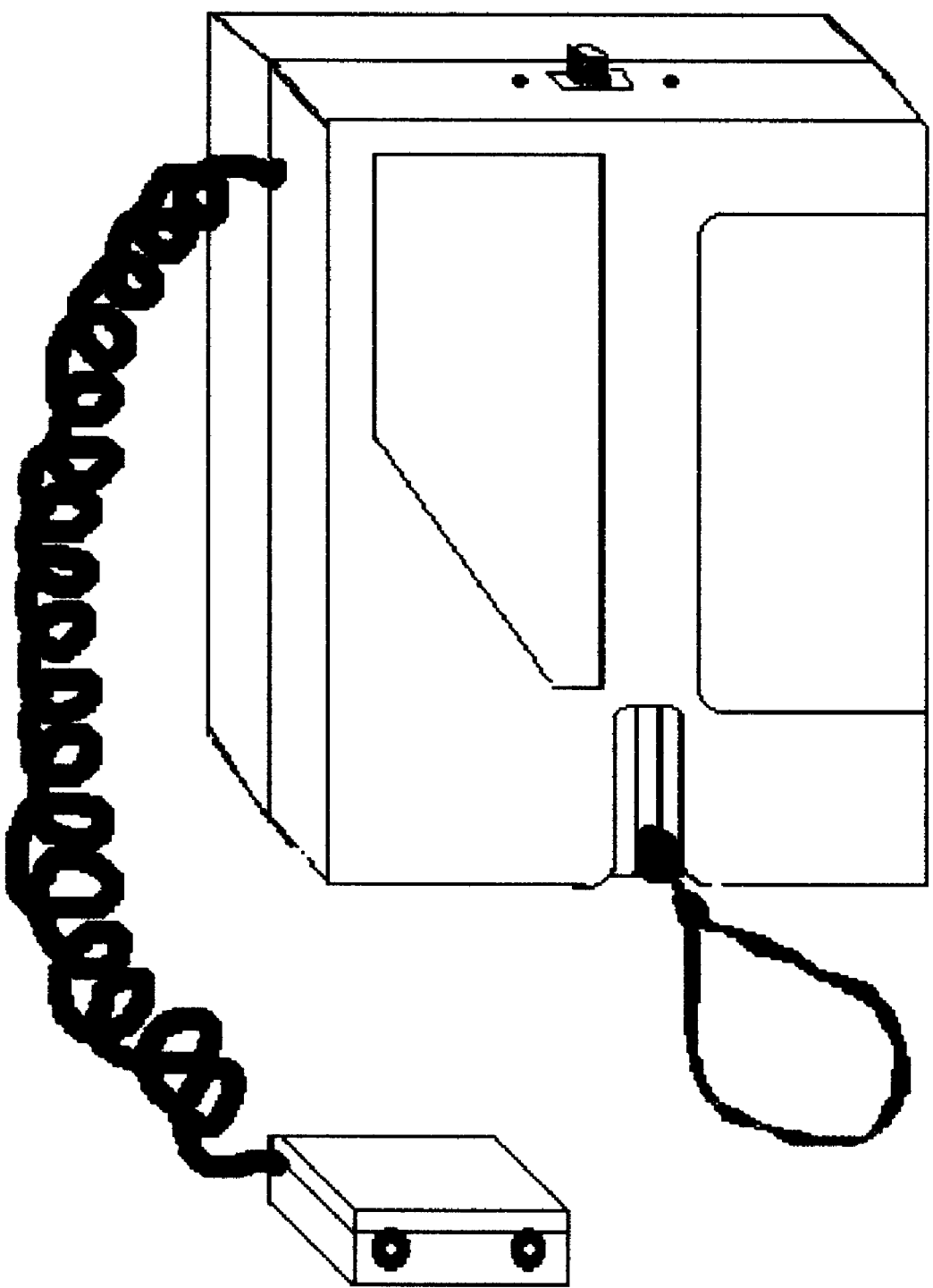
FIG. 1 is a completed view of the backup device named the Line Backer that assists the driver in backing up to a trailer.

A completed view of the Line Backer is illustrated in FIG. 1. In referring to FIG. 2 the following numbered parts are described #1 plastic box halves, #2 on and off switch that fits into #3 switch mount holes, #4 is the battery compartment which houses two AAA batteries that also require #14 battery clips, #5 are the left and right metal contacts for when #8 steel cable runs out between them which also passes current through 190 18 electrical wires and makes contact with either left or right contacts which signals the #20 led lights the #8 steel cable receives electrical current by contacting through the #15 alignment screw. The #15 alignment screw receives its current from the #18 electrical wires that are connected to the #4 battery compartment. Also going back to the #15 alignment screw it keeps the #8 steel cable in complete center of #5 metal contacts. The #8 steel cable is spring retracted inside the #7 retractable reel. The #9 captive screws and acorn nut #9 captive screw and acorn nut is made of metal that makes a good conductor for transferring a current through itself. For when it touches the #5 metal connectors it transfers current to both #20 led lights to make them come on simultaneously and when used with the #10 rubber bushing mounted between the captive screw and acorn nut grips the cable when the #9 captive screw and acorn nut are tightened together in desired length place, #24 crimped cable connector is used to hold a correct loop on the end of the cable. The #20 led lights are powered by the current running through the #6 electrical wire cord. The #6 wire cord also runs current through the #21 resistor that regulates the current to the #20 led lights, which is housed in the #19 light housing halves. As for the #1 and #19 plastic box housings they are held together by the #16 screw post and #11 screws, on the back of the #1 plastic box halves and #19 light housing halves are where the #22 flexible magnets mount. The #13 battery compartment lid slides into groves that cover the battery compartment. The #12 are wire mount holes that hold the #6 wire cord in place, #17 is the area designed to house the Line Backer label.

DETAILED DESCRIPTION OF THE INVENTION

Figure 2:
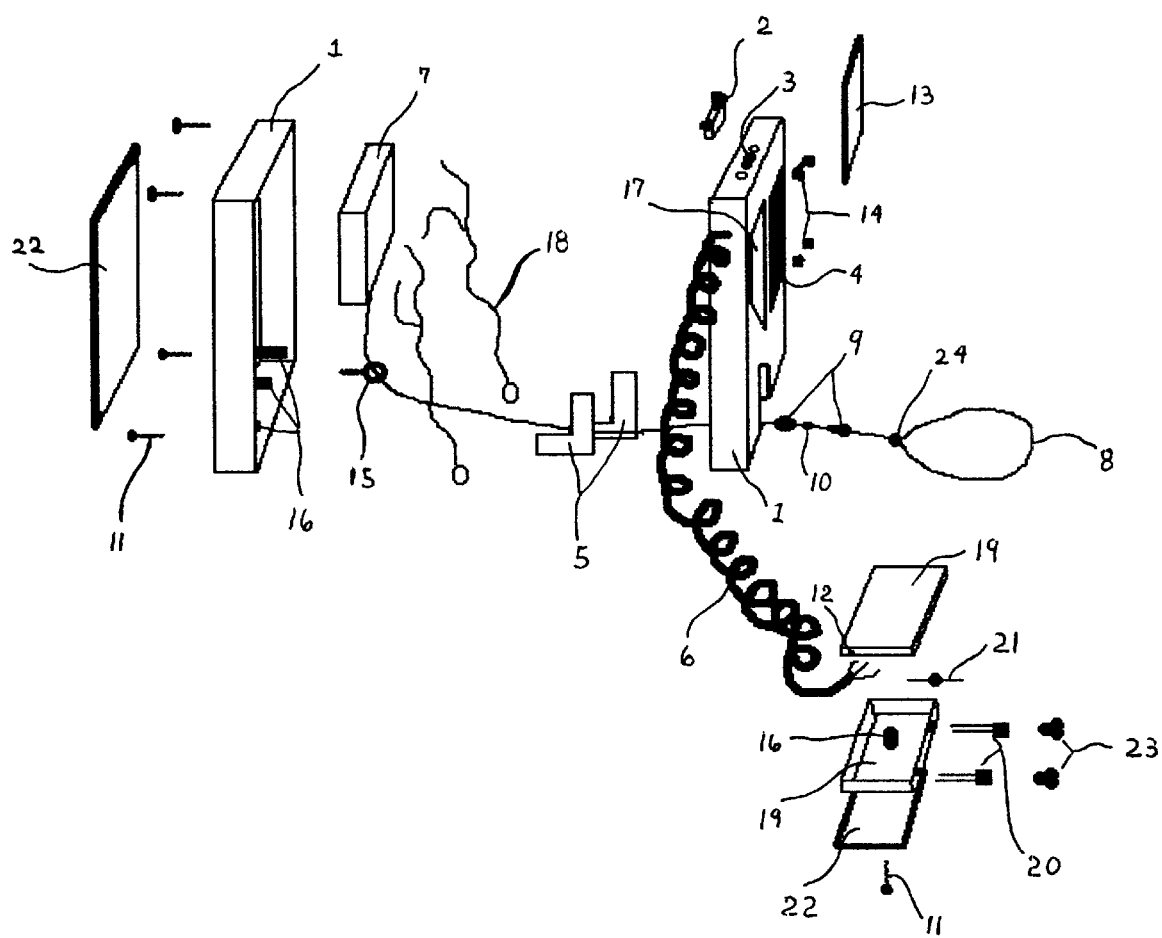
FIG. 2 is an exploded down view of the Line Backer of FIG. 1.

Refer to FIG. 1 & FIG. 2 for help on this description. The Line Backer is a device that assists the driver in backing up to a trailer by themselves. It eliminates the frustrations of getting in and out and walking back to check the alignment and also prevents damage to the vehicle and trailer. To work the Line Backer you place the larger box directly behind the vehicle ball on the tail gate it is held there by a strong flexible magnet, you then place the smaller box that is connected by a cord from the big box any place that it can be seen by the driver, which is also attached by a flexible magnet. Pull cable loop down towards the hitching ball, while holding the end of the loop directly over the ball slide the captive screw and acorn nut up towards the Line Backer box, with the Line Backer box turned on it should signal both led lights that can be seen by the driver. Now you proceed by pulling out the retractable cable and looping the end of the cable loop on to the trailer latch, that you are wanting to hook up to. The Line Backer is now ready to assist you in backing up to the trailer. When you are backing up if one led light or the other comes on you are turning to sharply in that direction and to slightly turn back until both lights are off. Continue backing up until both lights come on simultaneous, this means to stop immediately and go no further for you have reached perfect hooking alignment.

I claim:

1. A docking structure for a proximal vehicle and distal stationary apparatus, to assist the operator of the vehicle in backing up, comprising: an electric power source; a retractable cable reel assembly having an electrically conductive steel cable, with the proximal end of said cable connected to said cable reel assembly; left and right metal contact switches mounted respectively on a left and right side of said electrically conductive steel cable and connected to said electric power source; and a left and right light connected respectively to the said left and right metal contact switches; wherein when said steel cable touches the left metal contact switch, said contact powers the left light, and when said steel cable touches the right metal contact switch, said contact powers the right light; thereby enabling said operator to adjust the vehicle when the retractable cable reel assembly is secured to said vehicle, and the distal end of the cable is attached to said stationary apparatus; said electrically conductive steel cable further comprising a movable nut, which nut can contact both the left and right metal switches simultaneously; said movable nut thereby powering both lights simultaneously when the movable nut is adjusted to a preset position on the electrically conductive steel cable; said movable nut further comprising an acorn nut and a captive screw.

\* \* \* \* \*